United States Patent
Xiao et al.

(10) Patent No.: US 12,397,746 B2
(45) Date of Patent: Aug. 26, 2025

(54) PASSIVE ENTRY PASSIVE START SYSTEM AND METHOD, AND VEHICLE

(71) Applicant: NIO TECHNOLOGY (ANHUI) CO., LTD, Hefei (CN)

(72) Inventors: Bohong Xiao, Hefei (CN); Yiqi Han, Hefei (CN); Zheng Liu, Hefei (CN); Yang Liu, Hefei (CN); Yunwei He, Hefei (CN); Xinyi Kong, Hefei (CN); Tongzhou Zhou, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 200 days.

(21) Appl. No.: 17/720,467

(22) Filed: Apr. 14, 2022

(65) Prior Publication Data

US 2022/0332284 A1 Oct. 20, 2022

(30) Foreign Application Priority Data

Apr. 16, 2021 (CN) .......................... 202110410834.X

(51) Int. Cl.
*B60R 25/24* (2013.01)
*B60R 25/01* (2013.01)
(Continued)

(52) U.S. Cl.
CPC .............. *B60R 25/24* (2013.01); *B60R 25/30* (2013.01); *B60R 25/01* (2013.01);
(Continued)

(58) Field of Classification Search
CPC ......... B60R 25/24; B60R 25/30; B60R 25/01; B60R 2325/108; B60R 2325/20; G06F 21/602
(Continued)

(56) References Cited

U.S. PATENT DOCUMENTS 11,924,312 B2 * 3/2024 Mahany ............ H04L 12/40039
2018/0103414 A1 * 4/2018 Golsch .................... H04W 4/30
(Continued)

FOREIGN PATENT DOCUMENTS

CN 103733654 4/2014
CN 205387128 7/2016
(Continued)

OTHER PUBLICATIONS

Lennert Wouters, Fast, Furious and Insecure: Passive Keyless Entry and Start Systems in Modern Supercas, 2019, IACR Transactions on Cryptographic Hardware and Embedded Systems, vol. 2019, No. 3 (Year: 2019).*
(Continued)

*Primary Examiner* — Matthias S Weisfeld
(74) *Attorney, Agent, or Firm* — Sheridan Ross P.C.

(57) ABSTRACT

A passive entry passive start system includes a vehicle and a mobile terminal, the vehicle including a plurality of sensors configured to interact with the mobile terminal to acquire service-related data, each sensor being a master node or a slave node; a central module configured to perform data exchange with the sensors, and generate a corresponding control instruction based on the service-related data received from the sensors, and configured to designate one of the plurality of sensors as a master node and the other sensors and the central module as slave nodes, or designate the central module as a master node and the plurality of sensors as slave nodes, where the master node implements data exchange with the slave nodes; and a controller configured to receive the control instruction from the central module and execute a corresponding control action according to the control instruction.

13 Claims, 1 Drawing Sheet

(51) Int. Cl.
*B60R 25/30* (2013.01)
*G06F 21/60* (2013.01)

(52) U.S. Cl.
CPC ..... *B60R 2325/108* (2013.01); *B60R 2325/20* (2013.01); *G06F 21/602* (2013.01)

(58) Field of Classification Search
USPC .......................................................... 701/36
See application file for complete search history.

(56) References Cited

U.S. PATENT DOCUMENTS

| | | | |
|---|---|---|---|
| 2018/0265039 A1* | 9/2018 | Jain | B60R 25/31 |
| 2018/0268628 A1* | 9/2018 | Jain | G07C 9/00182 |
| 2019/0031141 A1* | 1/2019 | Lazarini | B60R 25/24 |
| 2020/0236494 A1* | 7/2020 | Ronan | H04L 12/403 |
| 2020/0298800 A1 | 9/2020 | Golsch | |
| 2020/0343993 A1* | 10/2020 | Rentschler | H04L 1/0002 |
| 2021/0136185 A1* | 5/2021 | Mahany | G06F 9/4418 |
| 2023/0164827 A1* | 5/2023 | Gao | H04W 72/0446 370/329 |
| 2023/0269566 A1* | 8/2023 | Spagnolini | G01S 7/003 455/39 |

FOREIGN PATENT DOCUMENTS

CN 208433098 1/2019
WO WO-2022075276 A1 * 4/2022

OTHER PUBLICATIONS

Extended Search Report for European Patent Application No. 22165351.2, dated Sep. 9, 2022, 6 pages.
Official Action with English Translation for China Patent Application No. 202110410834.X, dated Apr. 30, 2025, 20 pages.

* cited by examiner

PASSIVE ENTRY PASSIVE START SYSTEM AND METHOD, AND VEHICLE

CROSS-REFERENCE TO RELATED APPLICATION

This application claims the benefit of China Patent Application No. 202110410834.X filed Apr. 16, 2021, the entire contents of which are incorporated herein by reference in its entirety.

TECHNICAL FIELD

The invention relates to vehicle control technologies, and in particular, to a passive entry passive start (PEPS) system, a passive entry passive start method, and a vehicle.

BACKGROUND ART

In the current market, a conventional PEPS system is usually provided with a separate controller, which is responsible for acquiring radio frequency signals, processing signals, performing algorithm-based positioning, and receiving and sending controller area network (CAN) signals to implement control over a whole vehicle and transfer of information. However, in such a system solution, hardware of the controller is highly coupled with software thereof, and the development of an algorithm relies heavily on a condition of the hardware, making it not possible to implement agile development. In an age when software iterations are increasingly accelerated, this solution is not adaptable any more.

In addition, a passive entry system needs to position a key. Although positioning accuracy has been significantly improved with the popularization of neural networks, an algorithm has also imposed higher requirements for computing power of a chip. In this context, a single-chip microcomputer used in a conventional PEPS controller hardly satisfies requirements of computing power of a neural network, and the change of a chip will also lead to very high costs.

Therefore, there is a need to solve a problem of how to implement decoupling between hardware and software to separate a service and a functional application from hardware, a chip, and underlying software.

SUMMARY OF THE INVENTION

In view of the foregoing problem, the invention is intended to provide a passive entry passive start system, a passive entry passive start method, and a vehicle that can implement separation between hardware and software and can enhance development flexibility.

An aspect of the invention provides a passive start system applied to a vehicle. The vehicle includes:
a plurality of sensors configured to acquire service-related data from a mobile terminal, each sensor in the sensors having a master-slave integration function in which the sensor is able to be a master node or a slave node; and
a central module configured to determine, based on the service-related data received from the sensors, one of the plurality of sensors as a master node and the other sensors and the central module as slave nodes, or the central module itself as a master node and the plurality of sensors as slave nodes, where the master node implements data exchange with the slave nodes.

Optionally, the vehicle further includes:
a controller configured to receive the control instruction from the central module and execute a corresponding control action according to the control instruction.

Optionally, the central module is further configured to execute a corresponding control action according to the control instruction.

Optionally, further,
the sensors establish, based on a distance between the external mobile terminal and the vehicle, a short-range communication connection with the mobile terminal, continually obtain signal strength information of the mobile terminal, and provide the signal strength information as the service-related data to the central module, and the central module performs positioning computation based on the signal strength information, and generates, based on a result of the positioning computation, a control instruction related to passive entry passive start.

Optionally, the sensors have a short-range communication function, and the central module does not have a short-range communication function.

Optionally, the sensors send the acquired service-related data to the central module in an encrypted manner.

Optionally, the sensors send the acquired service-related data to the central module in a sub-packaging manner.

Optionally, the sub-packaging is performed based on a transmission priority set according to use of data.

Optionally, when the central module does not work or works as a slave node, the sensors still keep acquiring the signal strength information, and wake up the master node when determining, based on the signal strength information, that the mobile terminal is approaching the vehicle.

Optionally, the master node has authentication and authorization functions, and the slave nodes do not have authentication and authorization functions.

Optionally, the sensors are implemented by using a Bluetooth or an ultra-wideband technology.

Optionally, the control instruction includes a plurality of control instructions for implementing different functions, and the plurality of control instructions are set to have different distance thresholds from one another.

The invention provides a passive entry passive start method for a vehicle, where the vehicle includes: a sensor, a central module, and a controller. The method includes:
an acquisition step of performing interaction between the sensor and an external mobile terminal to acquire service-related data, the sensor having a master-slave integration function in which the sensor is able to be a master node or a slave node;
a computation step of computing and generating, by the central module, a corresponding control instruction based on the service-related data received from the sensor; and
an execution step of executing, by the controller, a corresponding control action according to the control instruction.

Optionally, in the acquisition step, the sensor establishes, based on a distance between the mobile terminal and the vehicle, a short-range communication connection with the mobile terminal, continually obtains signal strength information of the mobile terminal, and provides the signal strength information as the service-related data to the central module; and
in the computation step, the central module performs positioning computation based on the signal strength information, and generates, based on a result of the positioning computation, a control instruction related to passive entry passive start.

Optionally, in the acquisition step, the sensor sends the acquired service-related data to the central module in an encrypted manner.

Optionally, in the acquisition step, the sub-packaging is performed based on a transmission priority set according to use of data.

Optionally, in the acquisition step, the sensor establishes a Bluetooth connection or an ultra-wideband connection with the mobile terminal.

Optionally, when the central module does not work or works as a slave node, the sensors still keep acquiring the signal strength information, and wake up the master node when determining, based on the signal strength information, that the mobile terminal is approaching the vehicle.

The invention provides a computer-readable medium having stored thereon a computer program, where when the computer program is executed by a processor, the passive entry passive start method is implemented.

The invention provides a computer device including a storage module, a processor, and a computer program stored on the storage module and executable on the processor, where the processor implements, when executing the computer program, the passive entry passive start method.

The invention provides a vehicle having the passive entry passive start system.

An aspect of the invention provides a computer-readable medium having stored thereon a computer program, where when the computer program is executed by a processor, the passive entry passive start method is implemented.

An aspect of the invention provides a computer device including a storage module, a processor, and a computer program stored on the storage module and executable on the processor, where the processor implements, when executing the computer program, the passive entry passive start method.

An aspect of the invention provides a vehicle, having the passive entry passive start system according to an aspect of the invention.

As described above, according to the passive entry passive start system, the passive entry passive start method, and the vehicle in the invention, separation between software and hardware can be implemented, and development flexibility can be enhanced.

DETAILED DESCRIPTION OF EMBODIMENTS

Some of the embodiments of the invention are described below and are intended to provide a basic understanding of the invention. They are not intended to confirm key or decisive elements of the invention or limit the scope of protection.

For concise and illustrative purposes, this specification mainly describes the principles of the invention with reference to its exemplary embodiments. However, those skilled in the art will readily recognize that the same principles can be equivalently applied to all types of passive entry passive start systems and passive entry passive start methods, and the same principles can be implemented therein. Any such changes do not depart from the true spirit and scope of this patent application.

In addition, in the following description, reference is made to the accompanying drawings, which illustrate specific exemplary embodiments. Electrical, mechanical, logical, and structural changes can be made to these embodiments without departing from the spirit and scope of the invention. Furthermore, although the features of the invention are disclosed in combination with only one of several implementations/embodiments, if any given or recognizable function may be desired and/or advantageous, this feature can be combined with one or more other features of other implementations/embodiments. Therefore, the following description should not be considered in a limiting sense, and the scope of the invention is defined by the appended claims and their equivalents.

The terms such as "have" and "comprise" indicate that in addition to the units (modules) and steps that are directly and clearly described in the description and the claims, other units (modules) and steps that are not directly or clearly described are not excluded in the technical solutions of the invention.

Figure 1:
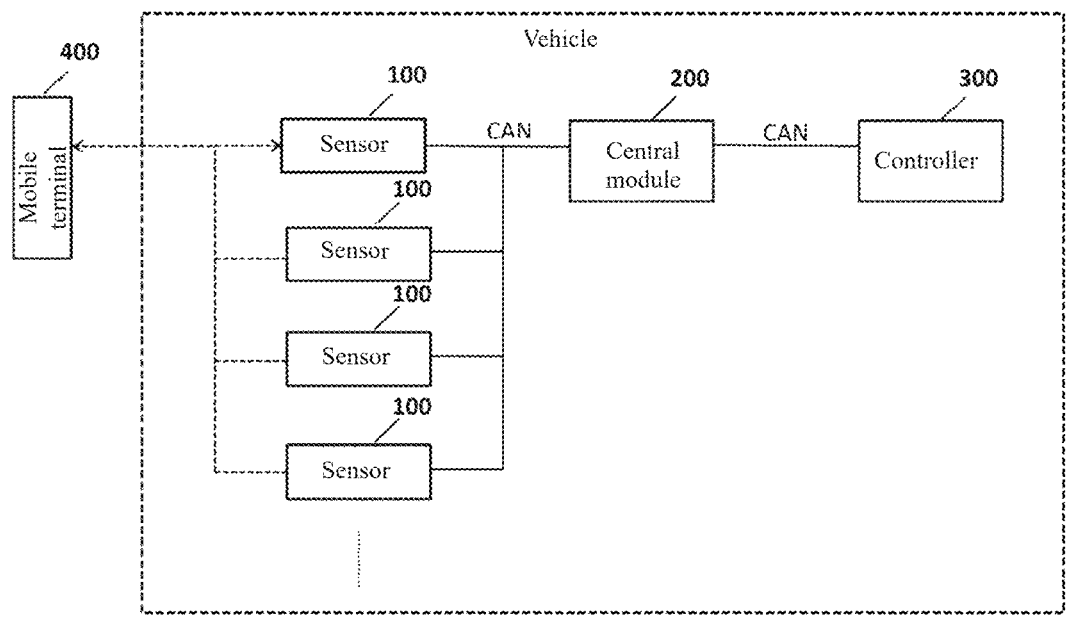
FIG. 1 is a structural block diagram illustrating a passive entry passive start system according to an implementation of the invention.

FIG. 1 is a structural block diagram illustrating a passive entry passive start system according to an implementation of the invention.

As shown in FIG. 1, the passive entry passive start system according to an implementation of the invention includes:
  a plurality of sensors (i.e., BTA sensors) 100 configured to acquire service data;
  a central module 200 configured to perform data exchange with the plurality of sensors, and generate a corresponding control instruction based on the service data received from the plurality of sensors; and
  a controller 300 configured to receive the control instruction from the central module and execute a corresponding control action according to the control instruction.

Preferably, the plurality of sensors 100, the central module 200, and the controller 300 are provided inside the vehicle, where the sensors 100 can communicate with a mobile terminal 400.

As an example, a case where four sensors 100 are provided is illustrated in FIG. 1. The number of sensors 100 is not limited in the invention. The plurality of sensors 100 are in a communication connection with the central module 200 through, for example, a CAN, and the central module 200 is in a communication connection with the controller 300 through, for example, a CAN. The controller 300 in the invention may include various types of controllers in the vehicle, for example, a body control module (BCM), a door control module (DCM), etc., which will not be listed one by one here.

In addition, as another example, instead of providing the controller 300 independently, it is also possible to integrate actions "receiving the control instruction and executing a corresponding control action according to the control instruction" executed by the controller 300 into the central module 200.

In the invention, the sensors 100 are subjects for performing a wireless communication. A wireless communication technology mainly used in the invention is a Bluetooth or ultra-wideband (UWB) technology.

The UWB technology is a wireless carrier communication technology that allows for data to be transmitted by using nanosecond-level non-sinusoidal narrow pulses, instead of using a sinusoidal carrier, and thus occupies a wide range of frequency spectra. The UWB technology has advantages of a low system complexity, a low transmit signal power spectral density, insensitivity to channel fading, a low interception capability, a high positioning accuracy, etc., and is especially applicable to high-speed wireless access in a dense multipath place, such as indoors. Here, because the UWB technology can also allow for flight signal-based ranging to be performed by means of time of flight (ToF), the positioning accuracy thereof can be as much as ten times more than that of conventional field strength ranging technologies.

In the invention, main functions of the sensors 100 include, but are not limited to:
- an underlying Bluetooth protocol stack, which is responsible for: establishing a connection and communication with the mobile terminal 400;
- obtaining positioning data related to positioning by means of a Bluetooth RSSI or UWB ranging; and
- providing the positioning data, authorization data, Bluetooth communication data, etc. as service data to the central module 200 through a CAN network.

In the invention, as an example, each of the plurality of sensors 100 has a short-range communication function, and the central module 200 does not have a short-range communication function.

The central module 200 has main logic and algorithms for a passive entry system integrated therein, and a main body thereof may be a central computing platform, or may be a domain controller. Main functions implemented by the central module 200 include, but are not limited to:
- communicating with the sensors 100 through a CAN network;
- receiving a service, such as a positioning service, an authorization service, and Bluetooth communication data, that is provided by the sensors 100;
- integrating a positioning algorithm and a logic strategy; and
- combining with various domain controller algorithms.

The second term "integrating a positioning algorithm and a logic strategy" above may also be referred to as software up-shifting or positioning algorithm up-shifting. Specifically, in the invention, the positioning algorithm is separated from positioning data. In other words, the positioning algorithm is deployed in the central module 200, while the positioning data is stored in the sensors 100. Such positioning algorithm up-shifting may allow for a higher positioning accuracy by means of strong computing power of the domain controller or the central computing platform, by using, for example, a deep learning algorithm. In addition, this manner can provide a higher extendibility, and can be combined with other controllers in the vehicle later to create more functions and applications based on a service provided by the sensors 100.

In addition, by using the third term "combining with various domain controller algorithms" above, more high-level functions, for example, big data acquisition, digital key sharing, AR application, artificial intelligence algorithm positioning, etc., can be implemented based on a service.

Here, content related to the foregoing positioning algorithm and positioning data separation is further specifically described.

Firstly, there is a desire to ensure that the positioning data obtained by the sensors 100 and data transmitted to the central module 200 are trusted to prevent a third-party device from interfering with data obtaining or seeking profits illegally. Therefore, to ensure the security of transmitted data, it is preferable that advanced encryption standard (AES) encryption may be performed during data acquisition, while a key is also issued from a cloud, to ensure that data acquired by each vehicle cannot be parsed without the key.

Secondly, there is also a desire to ensure the real-time performance of data acquisition and data analysis, because there is a high delay of a CAN bus itself, and also a Bluetooth delay and possibly delayed reactions of various modules. To solve the problem, it is proposed in the invention that data to be transferred may be transmitted in a sub-packaging manner according to use of data. For example, field strength data is set with a first priority, to ensure validity of a positioning function first, and authorization data may be of a lower priority. However, after a Bluetooth connection, authorization may be started, and there is a window exemption period after the success of the authorization, to prevent repeated authorization from causing a low transmission efficiency of valid data, thus resulting in a delay.

In addition, content related to sleep/wake-up management of the data acquisition and data analysis functions is described. In the prior art, in a conventional integrated module, data acquisition and analysis are put into sleep and waken up synchronously. In other words, after a whole vehicle enters a sleep mode after being locked, a positioning function is completely disabled. In the invention, separating a positioning algorithm from positioning data can allow for wakeup from the sleep mode in a timely manner. For example, even if when the central module does not work or works as a slave node, data (such as signal strength information) acquisition performed by a sensors is still in progress, a preliminary determination of a threshold is made, and a wake-up source is customized, such that once it is roughly determined that there is a mobile terminal approaching, a master node can be waken up immediately for further high-accuracy positioning.

Further, update and an iteration of over-the-air (OTA) related to an algorithm and a function are described. In the prior art, if software needs to be updated in a conventional module, four sensors need to be refreshed sequentially. However, after algorithm integration, a core region can be separated from an acquisition region, such that more than 80% of algorithm and function update can be completed by updating the central module, without the need to refresh the four sensors. For example, when four sensors are provided, a refresh time can be four times less than that in conventional methods, thereby bringing about a better user experience.

In addition, many protocols defined in central computing in the field of computers can only make it possible to "transmit as much as possible" just like TCP/IP, but cannot ensure data integrity. Consequently, problems such as network lag, an insufficient memory, and a need to restart often occur in the field of computers. However, unlike the field of computers, in the field pf vehicle control, a vehicle-mounted central computer can hardly withstand "restart" several times, or network lag several times.

Further, although only conventional "centralization" appears to be applied in the invention, some "decentralization" processing is actually performed in the invention, without completely centralizing other redundant logic such as unlocking and light control. In other words, only algorithms related to positioning are partly statically isolated, and errors of other logic or system use would not affect the central module 200 in the invention.

In addition, in the invention, the central module 200 is implemented by a central computing platform or a domain controller, which is a combination of computer and vehicle control technologies. Firstly, if a positioning algorithm is deployed in a plurality of sensors, a conventional Bluetooth module would be limited by an issue of calculation examples, and cannot perform functions such as digital key sharing or high-level positioning. However, if the positioning is completely centralized, the Bluetooth module and other modules would definitely impact each other. Once there is a problem, there may be a start-up failure, or at the worst, more unexpected faults may occur.

Therefore, the central module 200 in the invention is a module between a "node" and "complete centralization", which cannot only ensure an independent and robust system, and can also extend calculation examples for application to some extent, to implement functions that cannot be implemented in the prior art. In addition, once there is a system fault, the central module 200 may also find a system backup solution as long as a Bluetooth connection is still on.

Further, in the invention, all the sensors 100 have a master-slave integration capability. In other words, all the sensors can be connected to the mobile terminal 400 and transmit valid data with the mobile terminal. Master-slave integration means that each sensor 100 can serve as both a master device and a slave device.

As an example, the central module 200 may designate one sensor in the plurality of sensors 100 as a master node to perform functions on behalf of the central module. In this case, the other sensors in the plurality of sensors 100 are used as slave nodes. The sensor as the master node can perform data exchange with the sensors as the slave nodes. Certainly, as another example, the central module 200 itself may also be used a master node. In this case, the plurality of sensors 100 are used as slave nodes.

In the invention, the master node may be set to have authentication and authorization functions, and the slave nodes may be set not to have authentication and authentication functions.

An example is provided to illustrate the working of the sensor 100 as a master node.

For example, in the prior art, only a central module may send information, and the central module is provided inside a vehicle. When there is a metal shield, the central module cannot be connected to another Bluetooth device for positioning, such as Bluetooth on a charging pile. In this case, if the solution of the invention is applied, a sensor on a B pillar of a vehicle door may be "temporarily" switched to a master node from slave node. For example, when a user is pulling a charging gun, the charging gun cannot be connected to a master node inside the vehicle due to the shielding of the vehicle body, but to the sensor on the B pillar. Therefore, information about charging gun pulling can be obtained from the sensor on the B pillar to facilitate Bluetooth authentication and execution of some new functions, for example, automatically opening a charging port cover. In this way, the solution of the invention may allow for a corresponding node (a sensor) to be designated as a master node based on different working conditions, such that the passive entry passive start system and the passive entry passive start method can satisfy requirements of more application scenarios.

The passive entry passive start system and the passive entry passive start method according to an embodiment of the invention are then described.

Figure 2:
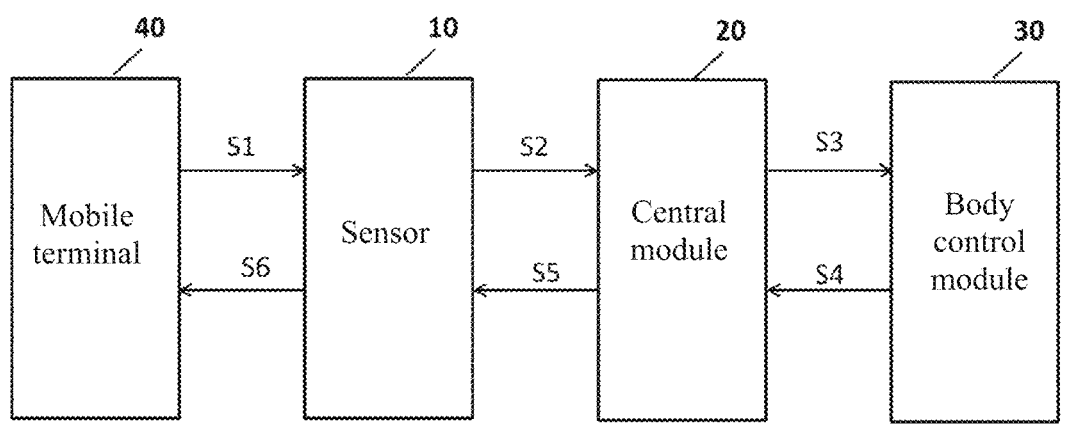
FIG. 2 is a structural block diagram illustrating a passive entry passive start system according to an embodiment of the invention.

FIG. 2 is a structural block diagram illustrating a passive entry passive start system according to an embodiment of the invention.

As shown in FIG. 2, the passive entry passive start system according to an embodiment of the invention includes:
a sensor 10 configured to acquire positioning data related to a mobile terminal 40;
a central module 20 configured to perform data exchange with the sensor 10, and generate a corresponding control instruction based on the positioning data received from the sensor 10; and
a body control module 30 configured to receive the control instruction from the central module 20 and execute a corresponding control action according to the control instruction.

The sensor 10 is in a communication connection with the central module 20 through a CAN, and the central module 20 is in a communication connection with the body control module 30 through a CAN.

The sensor 10 has a short-range communication function, where the sensor 10 is implemented by a Bluetooth module in this embodiment, and the central module 20 does not have a short-range communication function. The sensor 10 has a master-slave integration capability. In other words, the sensor 10 can be connected to the mobile terminal 40 and transmit valid data with the mobile terminal.

The passive entry passive start system and the passive entry passive start method according to an embodiment of the invention include the steps as follows. When the mobile terminal 40 is within a connection coverage of the sensor 10 at a vehicle side, the sensor 10 is responsible for establishing a Bluetooth connection with the mobile terminal 40, continually obtaining signal strength information, i.e., an RSSI, of the mobile terminal (S1 in FIG. 2), and providing, in a packaging manner, the signal strength information as a positioning service to the central module 20 through a CAN network (S2 in FIG. 2); and
after receiving the positioning service from the sensor 10, the central module 20 starts a positioning algorithm process, and the sensor 10 continuously positions the mobile terminal 40, where as an example, when the mobile terminal 40 is located as approaching the vehicle within a threshold range (such as within 1.5 m), the central module 20 determines whether a current vehicle status satisfies a condition for unlocking during approaching, and if the condition is satisfied, the central module sends an unlocking request as the control instruction to the body control module 30 (S3 in FIG. 2).

Here, the unlocking request is listed as the control instruction, which is merely an example. In the invention, the control instruction may be a control instruction for a plurality of functions, and a control instruction for each function may separately correspond to different distance thresholds, where for example, there may be a plurality of distance thresholds. In addition, the body control module 30 may further feed back a status of a vehicle door to the central module 20 (S4 in FIG. 2), the central module 20 may further feed back a positioning result to the sensor 10 (S5 in FIG. 2), and the sensor 10 may further feed back the positioning result to the mobile terminal 40 (S6 in FIG. 2).

The invention further provides a computer-readable medium having stored thereon a computer program, where when the computer program is executed by a processor, the passive entry passive start method is implemented.

The invention further provides a computer device, which includes a storage module, a processor, and a computer program stored on the storage module and executable on the processor, where the processor implements, when executing the computer program, the passive entry passive start method described above.

The invention further provides a vehicle, which has the passive entry passive start system described above.

As described above, according to the passive entry passive start system, the passive entry passive start method, and the vehicle in the invention, separation between software and hardware can be implemented, and development flexibility can be enhanced. In addition, the passive entry passive start system and the passive entry passive start method in the invention provide a higher extendibility, and can be combined with other controllers in the vehicle later to create more functions and applications based on a service provided by the sensors. In addition, by combining with various domain controller algorithms, more high-level functions, for example, big data acquisition, digital key sharing, AR application, artificial intelligence algorithm positioning, etc., can be implemented based on a service.

The foregoing examples mainly describe the passive entry passive start system, the passive entry passive start method, and the vehicle in the invention. Although only some specific implementations of the invention are described, a person of ordinary skill in the art should understand that the invention may be implemented in multiple other forms without departing from the essence and scope of the invention. Accordingly, the presented examples and implementations are considered to be illustrative rather than restrictive, and the invention may encompass various modifications and replacements without departing from the spirit and scope of the invention that are defined by the appended claims.

The invention claimed is:

1. A passive entry passive start system applied to a vehicle, wherein the passive entry passive start system comprises:
   a plurality of sensors configured to acquire service-related data from a mobile terminal, each sensor in the sensors having a master-slave integration function in which the sensor is able to be a master node or a slave node; and
   a central module configured to determine one of the plurality of sensors as a master node and the other sensors and the central module as slave nodes, or the central module itself as a master node and the plurality of sensors as slave nodes, wherein the master node implements data exchange with the slave nodes,
   wherein when a communication connection between the master node and an external device fails, the central module determines, from the slave nodes, a slave node that can establish a communication connection with the external device, sets the determined slave node as a new master node to replace the master node, and sets the master node as a slave node,
   wherein, prior to the communication connection between the master node and the external device failing, the master node has authentication and authorization functions and the slave nodes, including the slave node not yet set as the new master node, do not have authentication and authorization functions,
   wherein, after setting the new master node, the new master node has authentication and authorization functions and the slave nodes, including the master node now set as a slave node, do not have authentication and authorization functions,
   wherein the sensors establish, based on a distance between the mobile terminal and the vehicle, a short-range communication connection with the mobile terminal, continually obtain signal strength information of the mobile terminal, and provide the signal strength information as the service-related data to the central module,
   wherein the central module performs positioning computation based on the signal strength information, and generates, based on a result of the positioning computation, a control instruction related to passive entry passive start,
   wherein the central module is implemented by a central computing platform or a domain controller, and
   wherein the plurality of sensors do not have positioning computation capability.

2. The passive entry passive start system according to claim 1, wherein the vehicle further comprises:
   a controller configured to receive the control instruction from the central module and execute a corresponding control action according to the control instruction.

3. The passive entry passive start system according to claim 2, wherein
   the central module is further configured to execute a corresponding control action according to the control instruction.

4. The passive entry passive start system according to claim 2, wherein
   the control instruction comprises a plurality of control instructions for implementing different functions, and the plurality of control instructions are set to have different distance thresholds from one another.

5. The passive entry passive start system according to claim 1, wherein
   the sensors have a short-range communication function, and the central module does not have a short-range communication function.

6. The passive entry passive start system according to claim 1, wherein
   the sensors send the acquired service-related data to the central module in an encrypted manner.

7. The passive entry passive start system according to claim 1, wherein
   the sensors send the acquired service-related data to the central module in a sub-packaging manner.

8. The passive entry passive start system according to claim 7, wherein
   the sub-packaging is performed based on a transmission priority set according to use of data.

9. The passive entry passive start system according to claim 1, wherein
   when the central module does not work or works as the slave node, the sensors still keep acquiring the signal strength information, and wake up the master node when determining, based on the signal strength information, that the mobile terminal is approaching the vehicle.

10. The passive entry passive start system according to claim 1, wherein
    the new master node is set temporarily.

11. A vehicle, having the passive entry passive start system according to claim 1.

12. A passive entry passive start method for a vehicle, wherein the vehicle comprises: a plurality of sensors, a central module, and a controller, the method comprising:
    an acquisition step of performing interaction between a sensor of the plurality of sensors and an external mobile terminal to acquire service-related data, the plurality of sensors having a master-slave integration function in which each sensor is able to be a master node or a slave node;

a computation step of computing and generating, by the central module, a corresponding control instruction based on the service-related data received from the sensor; and an execution step of executing, by the controller, a corresponding control action according to the control instruction, wherein in the acquisition step, the sensor establishes, based on a distance between the mobile terminal and the vehicle, a short-range communication connection with the mobile terminal, continually obtains signal strength information of the mobile terminal, and provides the signal strength information as the service-related data to the central module;

wherein in the computation step, the central module performs positioning computation based on the signal strength information, and generates, based on a result of the positioning computation, a control instruction related to passive entry passive start, wherein the central module is implemented by a central computing platform or a domain controller, wherein the method further comprises, at the central module, determining one of the plurality of sensors as a master node and the other sensors and the central module as slave nodes, or the central module itself as a master node and the plurality of sensors as slave nodes, wherein the master node implements data exchange with the slave nodes, wherein, when a communication connection between the master node and an external device fails, determining, from the slave nodes, a slave node that can establish a communication connection with the external device, setting the determined slave node as a new master node to replace the master node, and setting the master node as a slave node, wherein, prior to the communication connection between the master node and the external device failing, the master node has authentication and authorization functions and the slave nodes, including the slave node not yet set as the new master node, do not have authentication and authorization functions, wherein, after setting the new master node, the new master node has authentication and authorization functions and the slave nodes, including the master node now set as a slave node, do not have authentication and authorization functions, and wherein the plurality of sensors do not have positioning computation capability.

13. The passive entry passive start method according to claim 12, wherein in the acquisition step, the sensor sends the acquired service-related data to the central module in an encrypted manner.

\* \* \* \* \*